(12) United States Patent
Dankesreiter et al.

(10) Patent No.: US 12,024,013 B2
(45) Date of Patent: Jul. 2, 2024

(54) AGRICULTURAL MACHINE TRANSMISSION, IN PARTICULAR FOR A FARM TRACTOR

(71) Applicant: ZF Friedrichshafen AG, Friedrichshafen (DE)

(72) Inventors: Martin Dankesreiter, Passau (DE); Thomas Oberbuchner, Passau (DE); Thomas Pauli, Passau (DE); Michael Haas, Hengersberg (DE); Anton Eder, Hutthurm (DE); Stefan Igl, Vilshofen (DE); Simone Landshuter, Haidmühle (DE); Thomas Spießl, Hauzenberg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/046,541

(22) Filed: Oct. 14, 2022

(65) Prior Publication Data

US 2023/0121147 A1     Apr. 20, 2023

(30) Foreign Application Priority Data

Oct. 15, 2021    (DE) ...................... 10 2021 211 663.9

(51) Int. Cl.
     *F16H 3/093*      (2006.01)
     *B60K 17/02*      (2006.01)
     (Continued)

(52) U.S. Cl.
     CPC .............. *B60K 17/08* (2013.01); *B60K 17/02* (2013.01); *F16H 3/093* (2013.01);
     (Continued)

(58) Field of Classification Search
     CPC ........ F16H 3/091; F16H 3/093; F16H 37/042; F16H 37/043; F16H 2003/0818;
     (Continued)

(56) References Cited

U.S. PATENT DOCUMENTS

| | | | |
|---|---|---|---|
| 4,244,232 | A | 1/1981 | Murayama |
| 5,358,458 | A | 10/1994 | Hicks |

(Continued)

FOREIGN PATENT DOCUMENTS

| | | |
|---|---|---|
| DE | 26 45 907 A1 | 4/1978 |
| DE | 102 31 838 A1 | 2/2004 |

(Continued)

*Primary Examiner* — William C Joyce
(74) *Attorney, Agent, or Firm* — Finch & Maloney PLLC

(57) ABSTRACT

An agricultural machine transmission has a powershiftable main group arranged upstream or downstream of a powershiftable split group in the direction of force transfer. The split group has an input shaft, an output shaft, and powershift elements, which when selectively actuated permit configurations of at least six different forward gears and at least three different reverse gears between the input shaft and the output shaft of the split group. A driveshaft of the main group is connectable by a first powershift clutch to a first input shaft and is connectable by a second powershift clutch to a second input shaft of the main group. Spur gear stages of the main group can be integrated into the force transfer path by actuating an associated shift element, coupling an associated input shaft to the drive shaft of the main group by configuring a respective gear of the main group.

12 Claims, 6 Drawing Sheets

Figure 1:
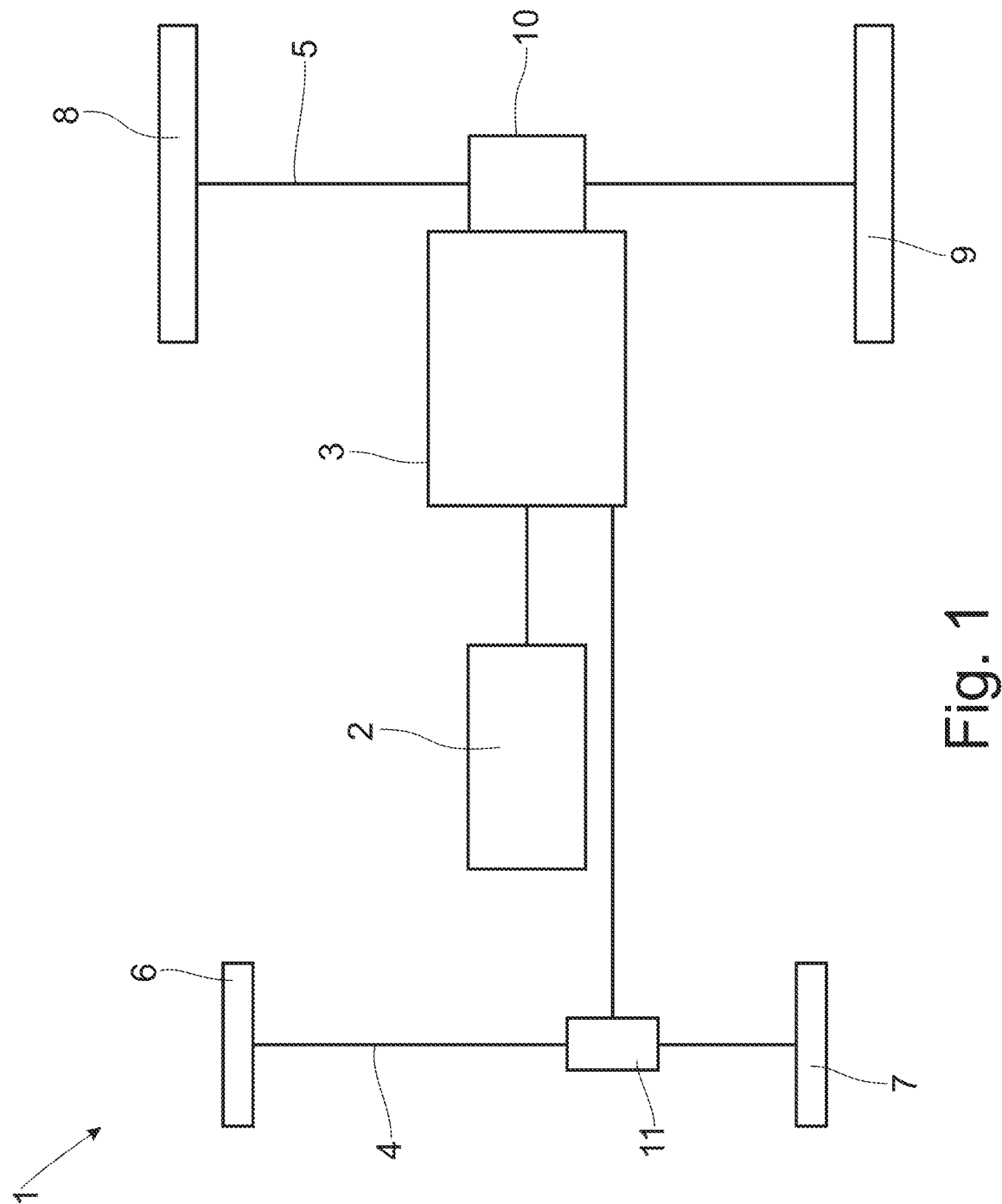

(51) Int. Cl.
  *B60K 17/08* (2006.01)
  *F16H 3/08* (2006.01)

(52) U.S. Cl.
  CPC ... *B60Y 2200/22* (2013.01); *F16H 2003/0818* (2013.01); *F16H 2200/0078* (2013.01); *F16H 2200/0091* (2013.01)

(58) Field of Classification Search
  CPC ....... F16H 2003/0826; F16H 2200/065; F16H 2200/0078
  See application file for complete search history.

(56) References Cited

U.S. PATENT DOCUMENTS

| | | | |
|---|---|---|---|
| 6,742,829 B2 | 6/2004 | Reihl | |
| 7,056,264 B2 * | 6/2006 | Kupper | F16H 61/688 477/181 |
| 8,051,732 B2 | 11/2011 | Gitt | |
| 8,166,842 B2 | 5/2012 | Rieger | |
| 8,578,801 B2 | 11/2013 | Gumpoltsberger et al. | |
| 9,145,959 B2 | 9/2015 | Otten | |
| 10,968,984 B2 * | 4/2021 | Pauli | F16H 3/093 |
| 2007/0277633 A1 | 12/2007 | Burgardt et al. | |
| 2009/0017957 A1 | 1/2009 | Triller et al. | |
| 2009/0173175 A1 | 7/2009 | Thery | |

FOREIGN PATENT DOCUMENTS

| | | |
|---|---|---|
| DE | 10 2005 044 068 A1 | 3/2007 |
| DE | 10 2007 046 737 A1 | 4/2009 |
| DE | 10 2007 000 595 A1 | 5/2009 |
| DE | 10 2013 200 646 A1 | 7/2010 |
| DE | 10 2009 000 776 A1 | 8/2010 |
| DE | 10 2009 000 778 A1 | 8/2010 |
| DE | 10 2009 000 779 A1 | 8/2010 |
| DE | 10 2010 029 597 A1 | 12/2011 |
| DE | 10 2011 007 597 A1 | 12/2012 |
| DE | 10 2011 084 621 A1 | 4/2013 |
| DE | 10 2013 200 646 A1 | 7/2014 |
| DE | 10 2013 110 709 A1 | 4/2015 |
| DE | 10 2015 206 881 A1 | 10/2016 |
| DE | 10 2019 202 962 * | 9/2020 |
| EP | 0 495 942 B1 | 1/1995 |
| EP | 1 624 232 A1 | 2/2006 |
| WO | WO 2016 165891 * | 10/2016 |

* cited by examiner

AGRICULTURAL MACHINE TRANSMISSION, IN PARTICULAR FOR A FARM TRACTOR

RELATED APPLICATIONS

This application claims the benefit of and right of priority under 35 U.S.C. § 119 to German Patent Application no. 10 2021 211 663.9, filed on 15 Oct. 2021, the contents of which are incorporated herein by reference in its entirety.

FIELD OF THE DISCLOSURE

The invention relates to an agricultural machine transmission, in particular for an agricultural tractor, comprising a powershift double split group and a powershiftable main group arranged upstream or downstream in the direction of force transfer in relation to a split group, wherein the split group has an input shaft, an output shaft, and several powershift elements, which when selectively actuated permit configurations of at least six different forward gears and at least three different reverse gears between the input shaft and the output shaft of the split group, wherein a driveshaft of the main group is connectable rotationally fixed by a first powershift clutch to a first input shaft of the main group, and is connectable rotationally fixed by a second powershift clutch to a second input shaft of the main group, and wherein several spur gear stages are provided between the input shafts and a pinion shaft of the main group, which can each be integrated into the force transfer path by actuating a respectively associated shift element, in which case the respectively associated input shaft of the main group individually couple to the pinion shaft of the main group by configuring respectively one gear of the main group. The invention also relates to an agricultural machine drivetrain with an aforementioned agricultural machine transmission and an agricultural machine.

BACKGROUND

Due to their wide-ranging uses, agricultural machines—and in particular agricultural tractors—must typically be configurable for various driving modes, which requires a wide spread between a slowest gear stage and a fastest gear stage for a transmission of such an agricultural machine. Furthermore, small geometrical incremental steps between the individual gear stages must typically be realized in an agricultural machine transmission, such that a large number of gears must be configurable in combination with the wide spread. Agricultural machine transmissions are typically constructed in a group design in order to realize this large number of gears with reasonable effort.

Such an agricultural machine transmission in this case typically comprises a stage group or main group, an upstream or downstream split group, in certain cases a range group typically arranged downstream, and frequently also a reverse group and a creep gear group. The gear sequence of the agricultural machine transmission is in this case controlled by the main group, wherein the latter is appropriately influenced by the upstream and/or downstream further transmission groups, depending on the transmission ratios selected here. In certain cases, a split group and a main group of an agricultural machine transmission have a powershiftable design in order to make gear changes—typically only in the split group and in the main group—under load and therefore with high comfort while the agricultural machine is in use.

DE 10 2015 206 881 A1 discloses an agricultural machine transmission based on a group design and having a split group and a main group. The split group has an input shaft, an output shaft, and a countershaft that are respectively arranged axis-parallel in relation to each other. Moreover, for a variant in DE 10 2015 206 881 A1, six powershift elements are mapped to the split group, which when selectively actuated can configure different force transfer paths from the input shaft of the split group to the output shaft using different spur gear stages of the split group. Using this split group, six different forward gears and six different reverse gears of the split group can be shifted. In the direction of force transfer, the output shaft of the split group is coupled rotationally fixed with a driveshaft of the main group in that the output shaft of the split group simultaneously also represents the driveshaft of the main group. The driveshaft of the main group can be respectively connected rotationally fixed to one input shaft each of the main group, wherein the powershift clutches are in this case combined into a double clutch. Moreover, three spur gear stages are provided between the input shafts of the main group and a pinion shaft of the main group, wherein one shift element each is mapped to the two spur gear stages provided between the first input shaft and the pinion shaft, which when actuated cause the respective spur gear stage to be integrated into the force transfer path, thus coupling the first input shaft to the pinion shaft by the respective spur gear stage. By contrast, the spur gear stage mapped to the second input shaft permanently couples the pinion shaft and the second input shaft to each other. By correspondingly actuating the powershift clutches, three different gears can be shifted between the driveshaft and the pinion shaft of the main group.

SUMMARY

Based on the prior art described above, it is now the task of the present invention to embody the aforementioned agricultural machine transmission such that a higher number of different gears can be powershifted.

This object is achieved by embodiments disclosed herein. An agricultural machine drivetrain with an agricultural machine transmission and an agricultural machine with an aforementioned agricultural machine drivetrain are also disclosed.

According to the invention, an agricultural machine transmission comprises a powershiftable split group and a powershiftable main group arranged upstream or downstream of the split group in the direction of force transfer. The split group has an input shaft, an output shaft, and several powershift elements, which when selectively actuated can configure at least six different forward gears and at least three different reverse gears between the input shaft and the output shaft of the split group. Moreover, a driveshaft of the main group can also be connected rotationally fixed to a first input shaft of the main group by a first powershift clutch, and can also be connected rotationally fixed to a second input shaft of the main group by a second powershift clutch. Furthermore, several spur gear stages are provided between the input shafts and a pinion shaft of the main group that can each be integrated into a force transfer path by actuating a respectively associated shift element, and in doing so can individually couple the respectively associated input shaft of the main group to the pinion shaft of the main group by configuring respectively one gear of the main group.

For the purposes of the invention, an "agricultural machine transmission" is defined as a transmission that is specifically provided for use in an agricultural machine. According to the invention, an agricultural machine is defined as a utility vehicle provided for use in agricultural applications. For purposes of the invention, an agricultural machine then preferably represents an agricultural tractor, wherein the agricultural machine can also take the form of a system vehicle, such as an equipment carrier, or also the form of a self-driving harvester.

For the purposes of the invention, a "shaft" is defined as a rotating component of the agricultural machine transmission, by which a force transfer path can be arranged between components, where required by simultaneously actuating a corresponding powershift element or shift element or a corresponding powershift clutch, each respectively. The respective shaft can connect components of the agricultural machine transmission to one another axially or radially, or also both axially and radially. The respective shaft can therefore also be present as an intermediate element by which a respective component is connected, for example, radially. Moreover, the respective shaft can either be formed as an integral component or as multiple parts in that the respective shaft is made up of several shaft components connected to each other in a rotationally fixed manner.

For the purposes of the invention, the term "axial" is defined as an orientation in the direction of a longitudinal center axis of the agricultural machine transmission, parallel to which axes of rotation of rotating components of the agricultural machine transmission are arranged. The term "radial" is then defined as an orientation in diameter direction of a respectively rotating component, in particular of a respective shaft or a respective spur gear.

On the split group of the agricultural machine transmission, an input shaft and an output shaft are provided that can be coupled to each other by selectively actuating several powershift elements by shifting different gears of the split group. The input shaft and the output shaft are in this case preferably arranged at an axis offset in relation to each other, wherein the split group further preferably has several spur gear stages that can be integrated depending on the selective actuation of the powershift elements, thus realizing different force transfer paths from the input shaft to the output shaft. The split group can in this case shift at least six different forward gears and at least three different reverse gears between the input shaft and the output shaft of the split group. Gears of the split group can in this case be shifted under load, e.g. a shift from a respective actual gear of the split group to a target gear of the split group to be shifted can substantially be made without interrupting the tractive force. The powershift elements are in this case in particular adapted as friction locking shift elements that are particular preferably present as lamella shift elements.

In the direction of force transfer, a powershiftable main group is arranged in the agricultural machine transmission upstream or downstream of the split group, the main group having a driveshaft and a pinion shaft. This main group can in this case be arranged upstream of the split group in the direction of force transfer in that the pinion shaft of the main group is either permanently coupled to the input shaft of the split group or can be coupled to the latter. For a permanent rotationally fixed connection between the pinion shaft of the main group and the input shaft of the split group, the pinion shaft and the input shaft can in this case also be formed as an integrated component. But particularly preferably, the main group is arranged within the agricultural machine transmission downstream of the split group in the direction of force transfer, wherein the output shaft of the split group is then either permanently coupled to the driveshaft of the main group, or can be coupled to the latter. For a permanent coupling in the form of a rotationally fixed connection, the output shaft of the split group and the driveshaft of the main group can also be formed as an integral component in the form of a rotationally fixed connection, e.g. can be formed by one and the same shaft.

For the main group, the driveshaft can be respectively connected rotationally fixed by two powershift clutches to one input shaft each of the main group. In this case, the first powershift clutch—in the actuated state—makes a rotationally fixed connection of the driveshaft to a first input shaft of the main group, whereas closing the second shift clutch makes a rotationally fixed connection between the drive shaft and a second input shaft. Several spur gear stages are provided between the input shaft and the pinion shaft of the main group. By actuating a respectively associated shift element, the aforementioned spur gear stages can individually establish a coupling of the respective input shaft to the pinion shaft.

In this regard, the main group is made up of two partial transmissions that respectively each have an input shaft and to which respectively several spur gear stages are mapped. The individual spur gear stage can in this case be integrated into the force transfer path by actuating an associated shift element, and subsequently couples the associated input shaft to the pinion shaft. By additionally actuating the associated powershift clutch, the associated input shaft of the respective partial transmission can also be connected rotationally fixed to the drive shaft of the main group such that the driveshaft is ultimately coupled to the pinion shaft of the main group with the transmission ratio defined by the respective spur gear stage. The ability of the main group to perform a powershift is in this case achieved in that in the shifted state of a gear in the one partial transmission of the main group, a subsequent gear is already preselected in the respectively other partial transmission, in that the pinion shaft is already coupled to the input shaft of the respectively other partial transmission by actuating the associated shift element of the spur gear stage representing this subsequent gear. The ultimate gear shift is then made by switching over between the powershift clutches, which can be performed under load and therefore substantially without interrupting a tractive force. With respect to the transmission ratios of the main group configured in the gears, the spur gear stages are in this case alternatingly distributed to the two partial transmissions, such that a shift can be made between adjacent gears in the course of a sequential shifting of the gears of the main group—always under load—by switching between the powershift clutches.

The powershift clutches are in particular adapted as friction locking clutches, wherein the individual powershift clutch can in this case be specifically adapted as a dry running or wet running friction clutch. A lamella clutch design is also a candidate for this. By contrast, the shift elements by which the spur gear stages of the main group can each be integrated into the force transfer path are preferably adapted as shape-locking shift elements, wherein the individual shift element can in this case be either adapted as an unsynchronized jaw shift element or as a locking synchronization.

In the direction of force transfer, a differential gearbox is preferably arranged downstream of the split group and the main group, which for the purpose of the invention can either be adapted as a longitudinal differential or as a transverse differential. Whereas a longitudinal differential is used to distribute a drive power to several drive axles of the agricultural machine, a transverse differential is used to distribute a drive power to drive wheels of a drive axle. Particularly preferably, the downstream differential gearbox is a transverse differential, wherein further preferably, a separating clutch is arranged on the output side of the split group and the main group, which when closed creates an additional force transfer path to a further drive axle. A multi-axis drive or an all-wheel-drive of the agricultural machine can then be realized by closing the separating clutch and the associated additional engagement of a further drive axle. For the preferred variant, wherein the main group is arranged downstream of the split group in the direction of force transfer, the transverse differential of the permanently driven drive axle is continuously coupled to the pinion shaft of the main group, wherein the pinion shaft can also be connected to the further, additionally engageable, drive axle by actuating the separating clutch.

The invention now comprises the technical teaching that at least four spur gear stages are provided for the main group. In other words, the main group of the inventive agricultural machine transmission then has four or more spur gear stages by which the respectively associated input shaft of the main group can be individually coupled to the pinion shaft of the main group.

Such a design of an agricultural machine transmission then has the advantage that a high total number of powershiftable gears of the agricultural machine transmission can be realized as a result and in combination with the powershiftable split group—on which at least six of forward gears and at least three reverse gears can be shifted, since increasing the number of spur gear stages of the main group allows more gears to be configured between the driveshaft and the pinion shaft of the main group, which in combination with the powershiftable gears of the split group results in a corresponding multiplication of the total number of gears. Due to the ability to powershift the split group and the main group, these gears can be adapted to be fully powershiftable. In total, an agricultural machine transmission with a high number of powershiftable gears can as a result be realized.

By contrast, the agricultural machine transmission disclosed in DE 10 2015 206 881 A1 only provides three spur gear stages by the main group when combining the main group with the split group, on which six different forward gears and six different reverse gears of the split group can be shifted.

Particularly preferably, the split group can shift exactly six different forward gears of the split group and at least three different reverse gears. As defined by the invention, a higher number of shiftable forward gears are principally also conceivable for the split group.

According to an embodiment of the invention, the split group has a countershaft, exactly six spur gear stages and exactly six powershift elements in addition to the input shaft and the output shaft. As a further enhancement of this embodiment, the teeth of a first spur gear interlock with those of a second spur gear, thus forming the first spur gear stage of the split group together with the second spur gear. The first spur gear is in this case arranged rotatably on the input shaft of the split group and can be locked on the input shaft of the split group by the first powershift element, and can be connected rotationally fixed to a third spur gear by the second powershift element. The second spur gear also meshes with a fourth spur gear and together with the latter forms the second spur gear stage, wherein the second spur gear is placed rotatably on the output shaft of the split group, and is connected rotationally fixed to a fifth spur gear by the third powershift element, and can be locked on the output shaft of the split group by the fourth powershift element. Moreover, the fourth spur gear is arranged rotatably on the countershaft and can be connected rotationally fixed to a sixth spur gear by the fifth powershift element, and can be locked on the countershaft by the sixth powershift element. The third spur gear is positioned rotatably on the input shaft of the split group and meshes with a seventh spur gear that forms the third spur gear stage together with the third spur gear, and is arranged rotationally fixed on the output shaft. The fifth spur gear is also positioned rotatably on the output shaft of the split group and whose teeth interlock with those of an eighth spur gear, which forms the fourth spur gear stage with the fifth spur gear and is arranged rotationally fixed on the input shaft. Further, the sixth spur gear is positioned rotatably on the countershaft of the split group and meshes with a ninth spur gear, which forms the fifth spur gear stage together with the sixth spur gear, and is arranged rotationally fixed on the output shaft. Lastly, the teeth of a tenth spur gear also interlock with those of an eleventh spur gear and together form the sixth spur gear stage, wherein the tenth spur gear is arranged rotationally fixed on the input shaft of the split group, and the eleventh spur gear is arranged rotationally fixed on the countershaft of the split group.

Alternatively, a first spur gear engages with the gears of a second spur gear and with the second spur gear forms the first spur gear stage of the split group, wherein the first spur gear is arranged rotatably on the input shaft of the split group and can be locked on the input shaft of the split group by the first powershift element, and can be connected rotationally fixed to a third spur gear by the second powershift element. Moreover, the second spur gear is placed rotatably on output shaft of the split group and can be connected rotationally fixed to a fourth spur gear by the third powershift element, and can be locked on the output shaft of the split group by the fourth powershift element. The first spur gear also meshes with a fifth spur gear and together with the first spur gear forms a second spur gear stage, wherein the fifth spur gear is arranged rotatably on the countershaft and can be connected rotationally fixed to a sixth spur gear by the fifth powershift element, and can be locked on the countershaft by the sixth powershift element. The third spur gear is also positioned rotatably on the input shaft of the split group and meshes with a seventh spur gear, which forms the third spur gear stage together with the third spur gear, and is arranged rotationally fixed on the output shaft. The fourth spur gear is also positioned rotatably on the output shaft of the split group and engages with the gears of an eighth spur gear, which forms the fourth spur gear stage with the fourth spur gear and is arranged rotationally fixed on the input shaft. Further, the seventh spur gear is positioned rotatably on the countershaft of the split group and meshes with a seventh spur gear, which forms the fifth spur gear stage with the sixth spur gear. Lastly, the teeth of a ninth spur gear also interlock with those of a tenth spur gear and together form the sixth spur gear stage, wherein the ninth spur gear is arranged rotationally fixed on the output shaft of the split group, and the tenth spur gear is arranged rotationally fixed on the countershaft of the split group.

The two aforementioned variants each permit realizing a suitable construction of the split group by which at least six forward gears of the split group and at least three reverse gears of the split group can be configured. Preferably, the powershift elements are in this case each axially arranged in pairs substantially at the height of the spur gear, which can be connected using the respectively two powershift elements, and are additionally placed radially in the interior in relation to the latter, resulting in a nested construction that in total permits achieving a compact design of the split group.

An enhancement of the embodiment results in a first forward gear of the split group by closing the first powershift element and the second powershift element, whereas a second forward gear of the split group can be shifted by actuating the third powershift element and the second powershift element. A third forward gear of the split group is configured by closing the first powershift element and the fourth powershift element, whereas a fourth forward gear of the split group results by actuating the third powershift element and the fourth powershift element. A fifth forward gear of the split group can also be shifted by closing the first powershift element and the fifth powershift element, whereas a sixth forward gear of the split group can be configured by actuating the third powershift element and the fifth powershift element.

A first reverse gear of the split group results by closing the sixth powershift element and the second powershift element, whereas the sixth powershift element and the fourth powershift element must be actuated to configure a second reverse gear of the split group. Lastly, a third reverse gear of the split group can be shifted by closing the sixth powershift element and the fifth powershift element.

According to a further conceivable embodiment of the invention, the main group is equipped with exactly four spur gear stages. As a result, four different gears can be advantageously shifted in the main group, wherein these four spur gear stages are in this case alternatingly mapped to the input shafts and therefore to the partial transmissions of the main group according to a sequence of their respectively configurable transmission ratios. Alternatively, exactly six spur gear stages are provided in the main group, thus correspondingly increasing the number of shiftable gears of the main group. Here too, the spur gear stages are in particular mapped alternatingly in the sequence of their respectively configurable transmission ratios to the input shafts of the main group, and therefore to the two partial transmissions of the main group.

In yet another embodiment of the invention, the individual spur gear stage of the main group is made up of one idler gear each and one fixed gear each, whose gears interlock, wherein the respective one fixed gear of the individual spur gear stage is placed rotationally fixed on the respective input shaft, whereas the respective one idler gear of the individual spur gear stage is positioned rotatably on the pinion shaft of the main group, and can be locked on the pinion shaft with the respectively associated shift element. Particularly preferably, all spur gear stages of the main group are arranged in this manner such that all fixed gears of the spur gear stages are arranged rotationally fixed on respectively one of the input shafts, whereas all idler gears are arranged rotatably on the pinion shaft and can in this case be locked with the respectively associated shift element. Alternatively thereto, it is equally conceivable for purposes of the invention that the respective idler gear on individual spur gear stages or all spur gear stages of the main group is arranged rotatably on the respectively associated input shaft, and can be connected rotationally fixed to the respectively associated input shaft with the respectively associated shift element, whereas the respective fixed gear is placed rotationally fixed onto the pinion shaft of the main group.

Shift elements of spur gear stages by which the same input shaft can be coupled respectively to the pinion shaft of the main group are preferably combined in pairs into shifting devices. Such a shifting device in this case is equipped with a common actuator element that when moved from a neutral position can—depending on the direction of movement—firstly cause an actuation of the one shift element, and secondly cause a closing of the other shift element. This can reduce the number of actuator elements of the main group, and therefore also the number of positioning actuators.

According to one embodiment of the invention, the powershift clutches are combined into a double clutch. This combined double clutch permits realizing a compact arrangement of the powershift clutches. In yet another embodiment of this conceivable design, the double clutch is positioned axially between the driveshaft and the input shaft of the main group, wherein the second input shaft is positioned as a hollow shaft axially overlapping and radially circumferentially in relation to the first input shaft. Alternatively, the double clutch is positioned axially between the first input shaft and the second input shaft, wherein one of the input shafts of the main group is positioned as a hollow shaft axially overlapping and radially circumferentially in relation to the driveshaft. A suitable arrangement of the double clutch can be achieved in both cases.

In one embodiment of the invention the output shaft of the split group is permanently coupled to the driveshaft of the main group. In this case, the main group is then arranged downstream of the split group in the direction of force transfer, wherein a permanent clutch exists between an output of the split group and an input of the main group. The output shaft of the split group and the driveshaft of the main group are in this case connected rotationally fixed to each other, wherein here too an integrated design of the output shaft of the split group and the driveshaft of the main group is possible. But particularly preferably, the output shaft of the split group and the driveshaft of the main group are coupled by at least one intermediate transmission stage, which can be a spur gear stage and/or a planetary stage.

Alternatively to the aforementioned embodiment, a creep gear group is provided in the direction of force transfer between the split group and the main group, wherein the output shaft of the split group can be connected rotationally fixed to the driveshaft of the main group by actuating a first shift element. Moreover, the creep gear group has a countershaft and a first spur gear stage and a second spur gear stage from which a spur gear stage permanently couples the countershaft to the output shaft or the driveshaft, whereas the other spur gear stage establishes a coupling of the countershaft to the driveshaft or the output shaft when a second shift element is actuated. In this case, a further transmission group is therefore provided in the direction of force transfer between the split group and the main group in the form of a creep gear group, by which the output shaft of the split group and the driveshafts of the main group are either connected rotationally fixed to each other or can be coupled to each other by configuring an additional transmission ratio. Using this additional transmission, a creep travel of the agricultural machine can be configured.

As defined by the invention, the agricultural machine transmission is preferably adapted as an automatic shift transmission, i.e. in particular shifting actions in the split group and the main group are performed automatically according to a stored shifting strategy. This execution is preferably performed by a control unit of the agricultural machine transmission.

The subject matter of the invention is also an agricultural machine drivetrain, wherein an agricultural machine transmission according to one or several of the aforementioned variance is provided. A drive side of the agricultural machine transmission, preferably the input shaft of the split group, is in this case permanently coupled to an upstream drive machine, which in particular is a combustion engine. In particular an interim torsion vibration damper is provided in this case. However, a separating clutch can also be positioned between the upstream drive machine and the respective transmission group of the agricultural machine transmission provided on the drive side, by which the transmission group provided on the drive side, and therefore the agricultural machine transmission, can be decoupled from the drive machine.

As already described above, the agricultural machine transmission is preferably permanently coupled to a drive axle of the agricultural machines within the agricultural machine drivetrain on the output side by an interim differential gearbox, whereas a further drive axle can only be added in by actuating a separating clutch.

The invention further relates to an agricultural machine that preferably is an agricultural tractor. This agricultural machine comprises an agricultural machine drivetrain according to one or several of the aforementioned variants.

The invention is not limited to the stated combination of the features of the main claim or the claims dependent thereon. By combining individual features, opportunities also result to the extent they are derived from the claims, the description below of preferred embodiments of the invention, or immediately from the drawings. The reference of the claims to the drawings by using reference symbols are not intended to limit the protected scope of the claims.

Figure 2:
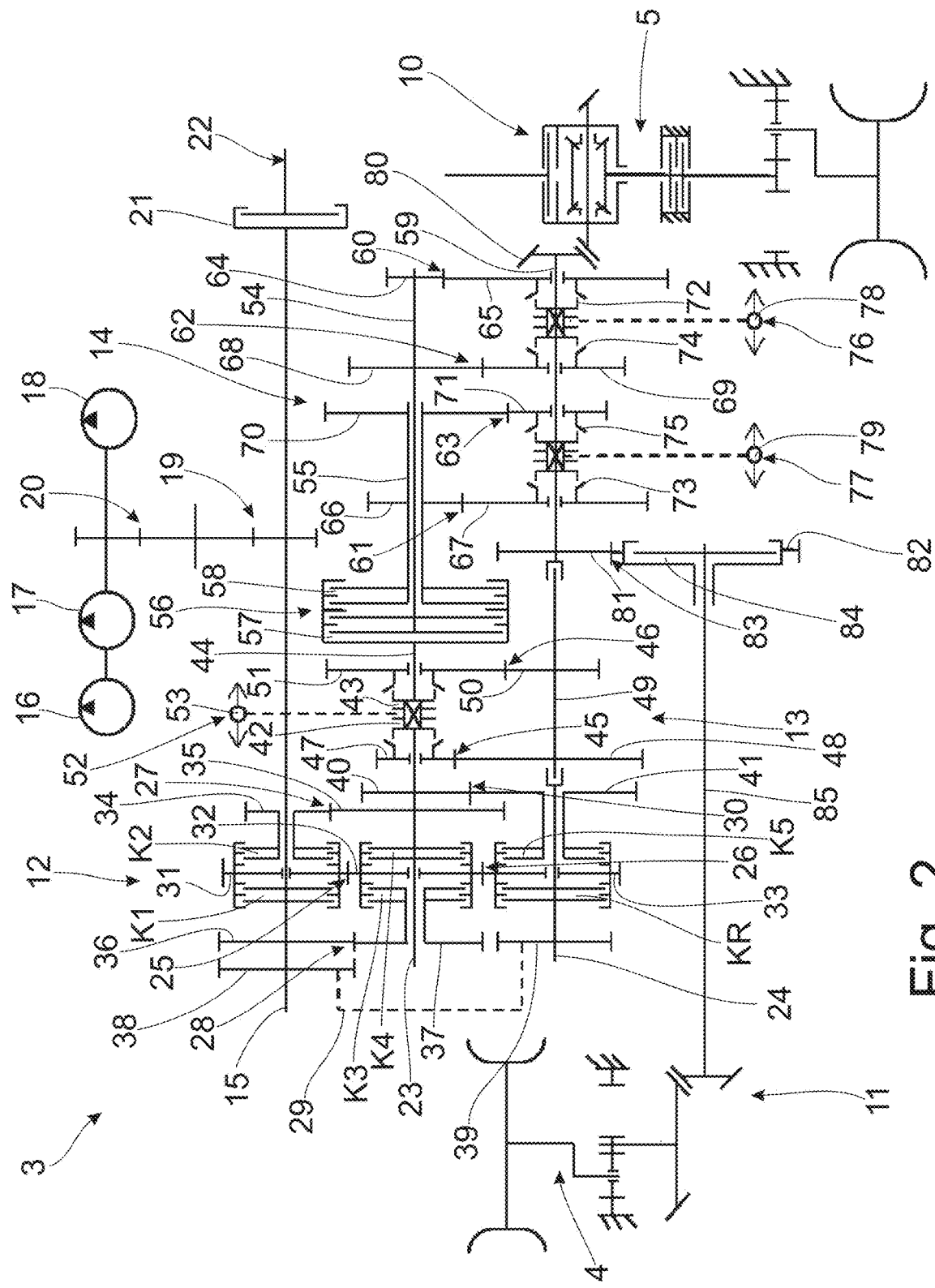
Figure 3:
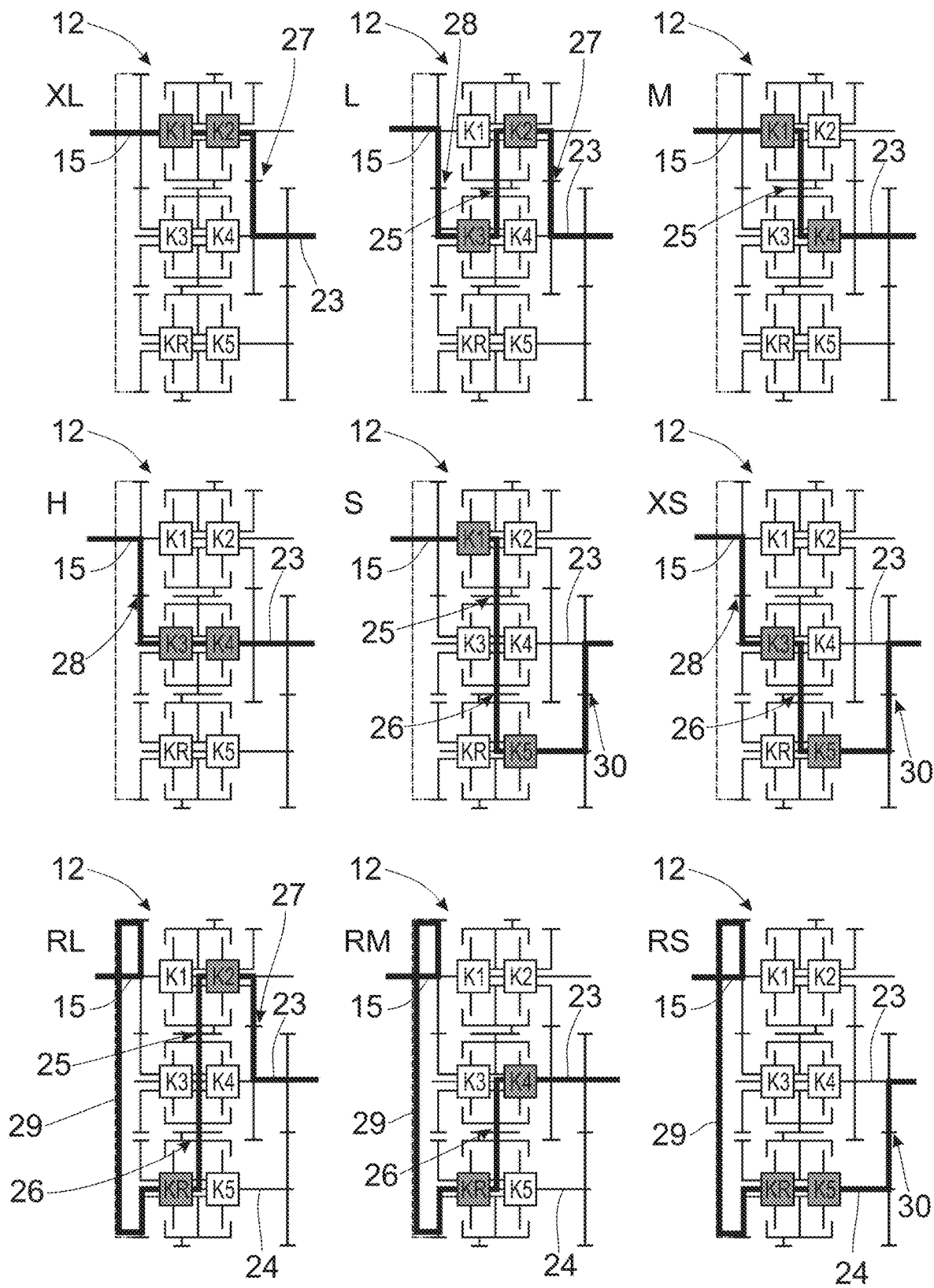
Figure 4:
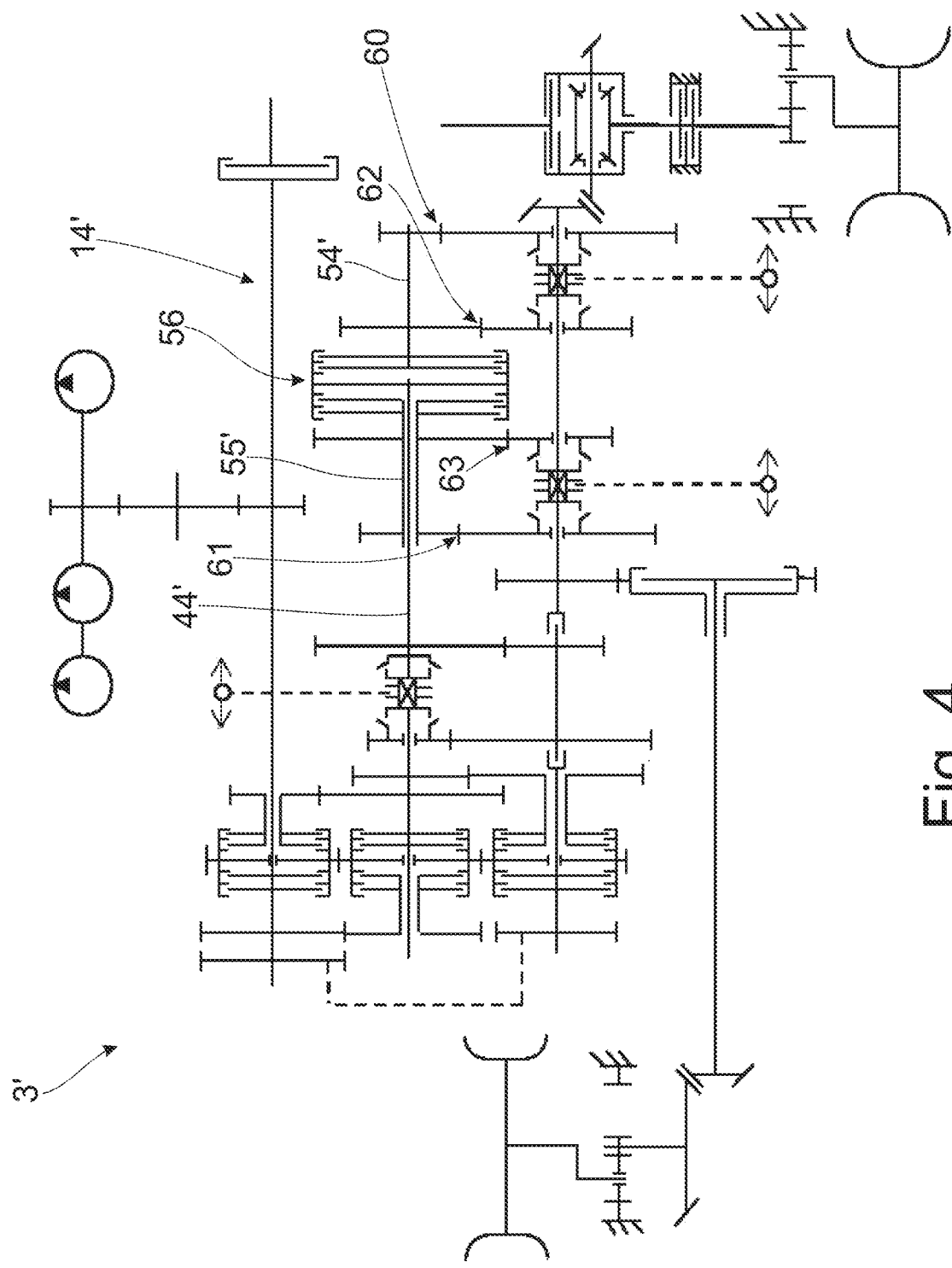
Figure 5:
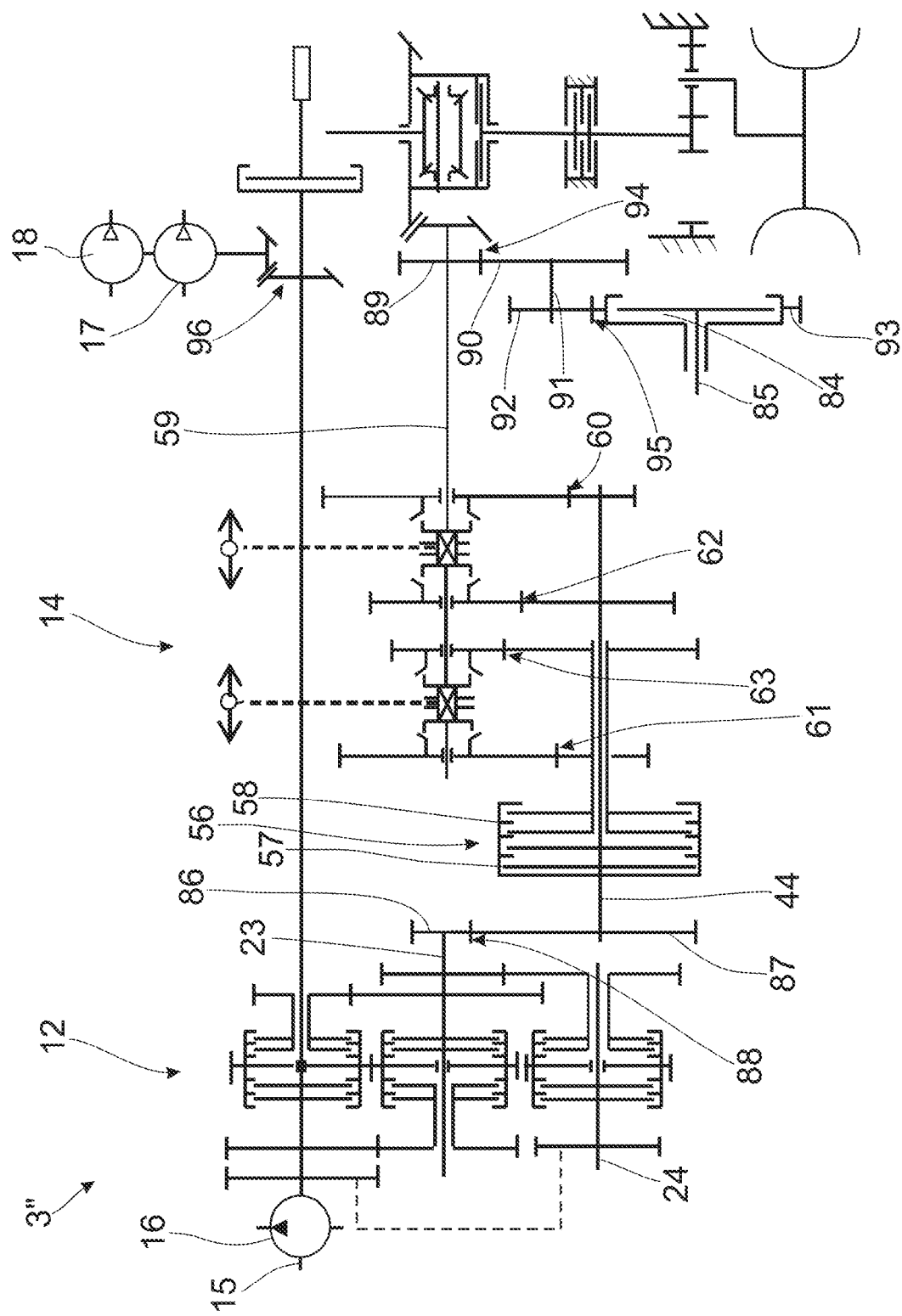
Figure 6:
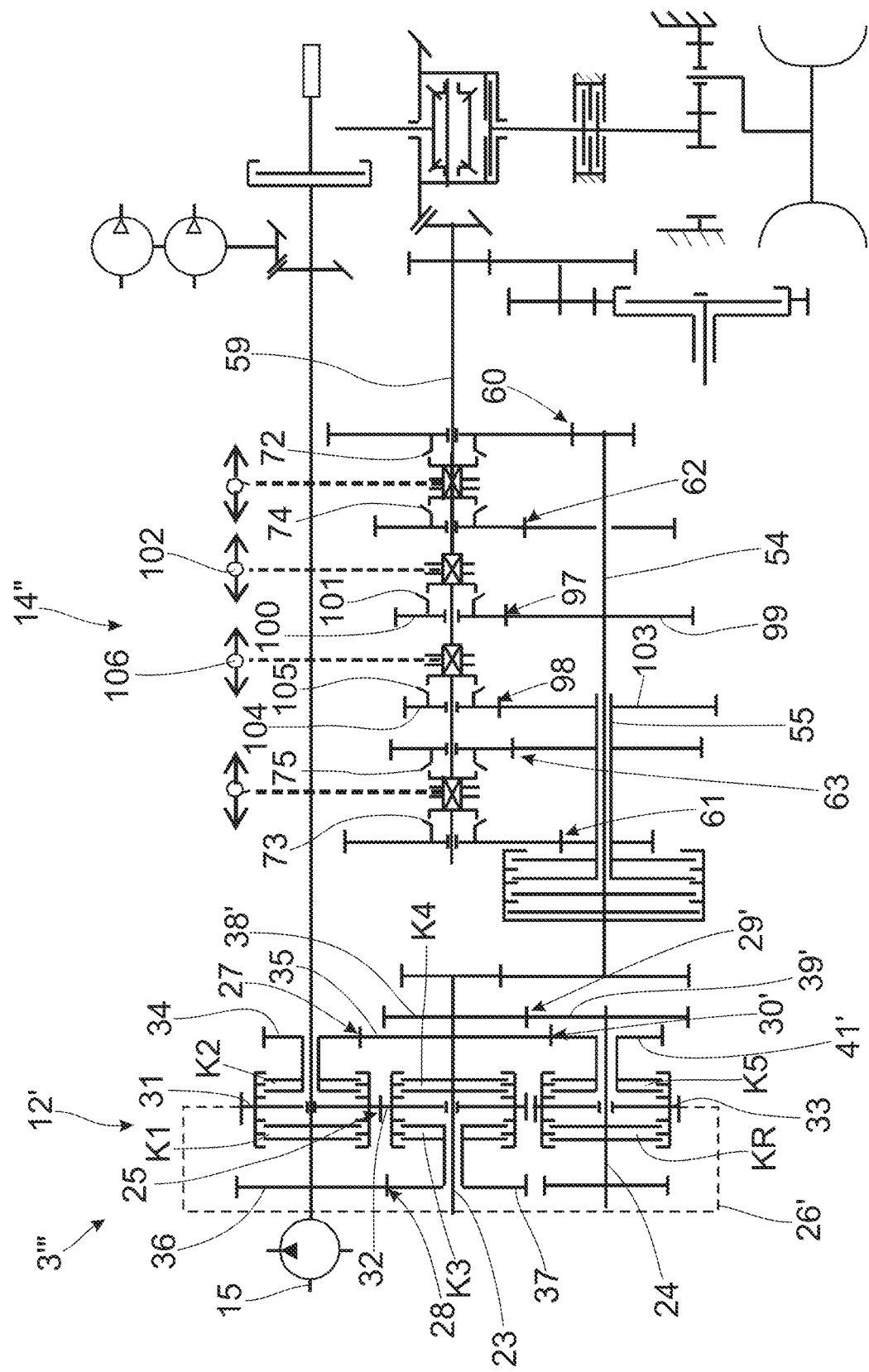

Advantageous embodiments of the invention, which are explained below, are shown in the drawings. These show in:

FIG. 1: a schematic representation of an agricultural machine drivetrain of an agricultural machine;

FIG. 2: a schematic detail view of the agricultural machine drivetrain from FIG. 1, shown in the region of an agricultural machine transmission according to a first embodiment of the invention;

FIG. 3: schematic detail views of different shifting states of a split group of the agricultural machine transmission from FIG. 2;

FIGS. 4 to 6: respectively one schematic detail view of the agricultural machine drivetrain from FIG. 1, respectively shown in the region of one agricultural machine transmission each according to respectively one further conceivable embodiment of the invention.

FIG. 1 shows a schematic view of an agricultural machine drivetrain 1 of an agricultural machine, which is preferably an agricultural tractor. The agricultural machine drivetrain 1 comprises a drive machine 2 adapted as a combustion engine, with an agricultural machine transmission 3 arranged in the agricultural machine drivetrain 1 downstream of the combustion engine.

The agricultural machine drivetrain 1 further provides two drive axles 4 and 5 that are each equipped with respectively two drive wheels 6 and 7, and 8 and 9, respectively. The drive axle 5 is in this case mapped to a differential gearbox 10 which as a transverse differential distributes an introduced drive power to the two drive wheels 8 and 9, if appropriate by compensating speed differentials. The differential gearbox 10 is in this case connected to the upstream agricultural machine transmission 3, wherein the differential gearbox 10 can in this case be combined with the agricultural machine transmission 3 into a common housing.

Notwithstanding the differential gearbox 10, the agricultural machine transmission 3 is additionally connected on the output side to a transmission 11 of the drive axle 4. The drive axle 4 in this case is preferably a front axle of the agricultural machine, whereas the drive axle 5 represents the rear axle of the agricultural machines.

FIG. 2 shows a schematic detail view of a part of the agricultural machine drivetrain 1 from FIG. 1, shown in the region of the agricultural machine transmission 3, wherein the latter is in this case formed according to a first embodiment of the invention. The agricultural machine transmission 3 is in this case adapted as a group design, and is made up of a split group 12, a creep gear group 13, and a main group 14.

As can be seen in FIG. 2, the split group 12 is mapped to an input shaft 15 that substantially extends over the full axial design length of the agricultural machine transmission 3, and on which a connection is made to the upstream drive machine 2 within the agricultural machine drivetrain 1 from FIG. 1. If required, a torsion vibration damper is provided in this case between the drive machine 2 and the input shaft 15. A drive-side, permanent coupling with several hydraulic pumps 16 to 18 of the agricultural machine drivetrain 1 is made on the input shaft 15, wherein this coupling is in this case made by two spur gear stages 19 and 20. Further, the input shaft 15 can be connected rotationally fixed to an auxiliary drive 22 by an intermediate separating coupling 21.

In addition to the input shaft 15, the split group 12 also has an output shaft 23 and a countershaft 24, wherein the input shaft 15, the output shaft 23, and the countershaft 24 are in this case each arranged at an axis offset in relation to each other. The three shafts 15, 23, and 24 are in this case in particular arranged at corner positions of an isosceles triangle and are, only for purposes of the representation in FIG. 2, projected into a drawing plane. The split group 12 further has six powershift elements K1, K2, K3, K4, K5, and KR and six spur gear stages 25 to 30. The powershift elements K1 to K5 and KR are in this case respectively adapted as friction locking shift elements, and in this specific case represent lamella clutches.

In the present case for the spur gear stage 25, a spur gear 31 is rotatably arranged on the input shaft 15, whose teeth interlock with those of a spur gear 32 that is rotatably arranged on the output shaft 23. In addition to the spur gear stage 25, the spur gear 32 is also part of the spur gear stage 26, in that the spur gear 32 at the same time—in addition to the gear interlocking with the spur gear 31—also meshes with a spur gear 33 that is rotatably arranged on the countershaft 24.

The spur gear stage 27 is made up of a spur gear 34 and a spur gear 35 whose teeth permanently interlock, whereas the spur gear 34 is in this case arranged rotatably on the input shaft 15, whereas the spur gear 35 is positioned rotationally fixed on the output shaft 23. Further, a spur gear 36 and a spur gear 37 together form the spur gear stage 28 in that the two spur gears 36 and 37 permanently mesh. The spur gear 36 is in this case arranged rotationally fixed on the input shaft 15, whereas the spur gear 37 is arranged rotatably on the output shaft 23.

As can further be seen in FIG. 2, the teeth a spur gear 38 and a spur gear 39 on the spur gear stage 29 permanently interlock, wherein the spur gear 38 is in this case arranged rotationally fixed on the input shaft 15, whereas the spur gear 39 is arranged rotatably on the countershaft 24 of the split group 12. Lastly, the spur gear stage 30 is also made up of a spur gear 40 and a spur gear 41, the teeth of which permanently interlock with the former. The spur gear 40 is in this case positioned rotationally fixed on the output shaft 23 of the split group 12, whereas the spur gear 41 is positioned rotatably on the countershaft 24.

Closing the powershift element K1 locks the spur gear 31 of the spur gear stage 25 on the input shaft 15, whereas actuating the powershift element K2 results in a rotationally fixed connection of the spur gear 31 to the spur gear 34. In the actuated state, the powershift element K3 connects the spur gears 37 and 32 rotationally fixed to each other, whereas closing the powershift element K4 causes the spur gear 32 to be locked on the output shaft 23. Further, actuating the powershift element K5 results in a rotationally fixed connection between the spur gears 33 and 41, whereas the powershift element KR in its closed state locks the spur gear 33 on the countershaft 24.

By selectively actuating the powershift elements K1 to K5 and KR, various gears of the split group 12 can be configured, whereas six forward gears and three reverse gears can be shifted in this case. Shift configurations of these gears are in this case shown in FIG. 3 with the associated force transfer paths within the split group 12, wherein a shift between the forward gears and between the reverse gears can in this case respectively be made under load.

For example, a first forward gear XL of the split group 12 results by simultaneously closing the powershift elements K1 and K2, which causes the force transfer path to be routed within the split group 12 from the input shaft 15 via the spur gear stage 27 to the output shaft 23 (see top left in FIG. 3). A second forward gear L of the split group 12 is shifted when the powershift element K3 and the powershift element K2 are closed simultaneously, wherein this results in a force transfer path from the input shaft 15 via the spur gear stage 28, the spur gear stage 25, and the spur gear stage 27 to the output shaft 23 (see center top in FIG. 3). Further, a third forward gear M of the split group 12 is configured when the powershift element K1 and also the powershift element K4 are actuated. This results in routing the force transfer path from the input shaft 15 via the spur gear stage 25 to the output shaft 23 of the split group 12 (see top right in FIG. 3).

As can also be seen in FIG. 3, a fourth forward gear H of the split group 12 results by simultaneously actuating the powershift elements K3 and K4, which causes the force transfer path to be routed within the split group 12 originating from the input shaft 15 over the spur gear stage 28 to the output shaft 23 (see center left in FIG. 3). Further, a fifth forward gear S can be shifted when the powershift element K5 is brought into a closed state in addition to the powershift element K1. This results in a force transfer path from the input shaft 15 over the spur gear stages 25 and 26, and the spur gear stage 30, to the output shaft 23 (see center in FIG. 3). Lastly, a sixth forward gear XS of the split group 12 is configured when the powershift elements K3 and K5 are actuated together. This results in a force transfer path originating from the input shaft 15 via the spur gear stage 28, the spur gear stage 26, and the spur gear stage 30 to the output shaft 23 (see center right in FIG. 3).

A first reverse gear RL of the split group 12 results by actuating the powershift elements K2 and KR, which routes the force transfer path originating from the input shaft 15 or the spur gear stage 29 to the countershaft 24, and originating from here via the spur gear stages 26, 25, and 27 to the output shaft 23 (see bottom left in FIG. 3). Further, a second reverse gear RM of the split group 12 can be shifted when the powershift element K4 is closed in addition to the powershift element KR. This results in a force transfer path from the input shaft 15 over the spur gear stage 29 to the countershaft 24, wherein the force transfer path then continues via the spur gear stage 26 to the output shaft 23 (see bottom center in FIG. 3). Lastly, a third reverse gear RS of the split group 12 can be configured when the powershift elements KR and K5 are closed simultaneously. This results in a force transfer path from the spur gear stage 29 from the input shaft 15 of the split group 12 to the countershaft 24, wherein the force transfer path then continues via the spur gear stage 30 to the output shaft 23 (see bottom right in FIG. 3).

As shown in FIG. 2, the creep gear group 13 of the agricultural machine transmission 3 is arranged in the force transfer direction between the split group 12 and the main group 14. The creep gear group 13 is in this case mapped to two shift elements 42 and 43 that are each adapted as shape locking shift elements, and in this specific case are each adapted as locking synchronizations. Whereas the shift element 43—when actuated—connects the output shaft 23 of the split group 12 rotationally fixed to a driveshaft 44 of the main group 14 positioned coaxially to the output shaft 23, the shift element 42—in its closed state—couples the output shaft 23 to the drive shaft 44 over two spur gear stages 45 and 46.

In this specific case, a spur gear 47 of the spur gear stage 45 is locked onto the output shaft 23 via the shift element 42, when the latter is actuated, wherein the teeth of the spur gear 47 in this case are permanently interlocked with those of a spur gear 48 within the spur gear stage 45, the former being arranged rotationally fixed on a countershaft 49 of the creep gear group 13. A spur gear 50 of the spur gear stage 46 is also arranged rotationally fixed on this countershaft 49, wherein the spur gear 50 is permanently meshed with a spur gear 51 positioned rotationally fixed on the driveshaft 44. Therefore, actuating the shift element 42 results in a force transfer path within the creep gear group 13 originating from the output shaft 23 of the split group 12 via the spur gear stage 45 to the countershaft 49, and originating from here via the spur gear stage 46 to the driveshaft 44 of the main group, wherein this results in a transmission ratio toward slow.

The two shift elements 42 and 43 are presently combined into a shift device 52, by whose common actuator element 53 either the shift element 42 or the shift element 43 can be brought into the respectively actuated state from a neutral setting.

The main group 14 has two input shafts 54 and 55 that are arranged coaxially in relation to each other and also in relation to the driveshaft 44. The input shaft 55 is in this case formed as a hollow shaft that is positioned axially overlapping and radially circumferential in relation to the input shaft 54. A double clutch 56 is also provided axially between the driveshaft 44 and the input shafts 54 and 55, the double clutch 56 being formed by a powershift clutch 57 and a powershift clutch 58. When actuated, the powershift clutch 57 connects the driveshaft 44 rotationally fixed to the input shaft 54 of the main group 14, whereas the powershift clutch 58 in its closed state connects the driveshaft 44 and the input shaft 55 rotationally fixed to each other.

Further, a pinion shaft 59 of the main group 14 is provided at an axis offset to the driveshaft 44 and to the two input shafts 54 and 55, the pinion shaft 59 in this case being arranged coaxially in relation to the two countershafts 24 and 49 of the split group 12 and the creep gear group 13. The countershaft 49 is in this case rotatably positioned axially on both sides, firstly in the countershaft 24 and secondly in the pinion shaft 59.

As can further be seen in FIG. 2, the main group 14 comprises four spur gear stages 60 to 63, by which respectively one of the input shafts 54 and 55 can be coupled to the pinion shaft 59 to configure respectively one gear of the main group 14. In the present case, the spur gear stage 60 in this case is made up of a fixed gear 64 and an idler gear 65 whose teeth engage with those of the former, wherein the fixed gear 64 is arranged rotationally fixed on the input shaft 54, and the idler gear 65 is positioned rotatably on the pinion shaft 59. Likewise, the spur gear stage 61 is formed by a fixed gear 66 and an idler gear 67, which permanently meshed with each other, and of which the fixed gear 66 is positioned rotationally fixed on the input shaft 55, whereas the idler gear 67 is positioned rotatably on the pinion shaft 59.

The spur gear stage 62 is in turn provided between the input shaft 54 and the pinion shaft 59 in that a fixed gear 68 arranged rotationally fixed on the input shaft 54 interlocks its teeth with those of an idler gear 69 that is positioned rotatably on the drive shaft 59. Lastly, the spur gear stage 63 is made up of a fixed gear 70 and an idler gear 71 that are permanently meshed. Whereas the fixed gear 70 is in this case provided rotationally fixed on the input shaft 55, the idler gear 71 is positioned rotatably on the pinion shaft 59.

Further, the main group 14 has a plurality of shift elements 72 to 75, which in this case are adapted as shape-locking shift elements in the form of locking synchronizations. When actuated, the shift element 72 then locks the idler gear 65 of the spur gear stage 60 on the pinion shaft 59, causing the input shaft 54 and the pinion shaft 59 to be coupled to each other by the spur gear stage 60. If the shift element number 73 is by contrast closed, this results in a rotationally fixed connection of the idler gear 67 of the spur gear stage 61 to the pinion shaft 59, and therefore couples the input shaft 55 to the pinion shaft 59 via the spur gear stage 61. Further, the idler gear 69 of the spur gear stage 62 can be locked on the pinion shaft 59 by the shift element 74, causing the input shaft 54 and the pinion shaft 59 to be coupled to each other by the spur gear stage 62. Closing the shift element 75 results in a rotationally fixed connection of the idler gear 71 to the pinion shaft 59, thus coupling the input shaft 55 and the pinion shaft 59 via the spur gear stage 63.

The spur gear stages 60 to 63 are arranged following the double clutch 56 in the order spur gear stage 61, spur gear stage 63, spur gear stage 62, and lastly spur gear stage 60. In terms of the respectively configurable transmission ratio and therefore in terms of the respectively shiftable gear, the spur gear stage 60 has the highest transmission ratio, wherein the latter is then in terms of transmission ratio firstly followed by the spur gear stage 61, then by spur gear stage 62, and lastly spur gear stage 63. In this respect, the respectively shiftable gears are alternatingly distributed to the two input shafts 54 and 55, and therefore to partial transmissions of the main group 14 formed as a result. In interaction with the double clutch 56, the gears of the main group 14 can therefore be sequentially shifted in terms of transmission ratio, under load, in the manner of a double clutch transmission when a respectively following gear is already preselected prior to a gearshift given a current power transmission path over one of the spur gear stages 60 to 63 by actuating the respectively associated shift element 72, 73, 74, 75, each respectively, while also simultaneously actuating one of the powershift clutches 57 and 58. The respectively following gear is preselected by actuating the respectively associated shift element 72, 73, 74, 75, each respectively, wherein the ultimate gearshift then only needs to occur by switching between the powershift clutches 57 and 58 under load.

The shift elements 72 to 75 are each combined in pairs to one shift device 76 or 77, each respectively. The shift device 76 in this case has an actuator element 78 by which either the shift element 72 or the shift element 74 can be actuated from a neutral setting. Likewise, the shift element 73 on the one hand, and the shift element 75 on the other, can be actuated from a neutral setting by an actuator element 79 of the shift device 77.

A bevel gear 80 on the one hand, and a spur gear 81 on the other hand, are arranged rotationally fixed on axial ends on the pinion shaft 59, wherein the coupling of the pinion shaft 59 to the downstream differential gearbox 10 is established over the bevel gear 80, the differential gearbox 10 in this case being adapted in the matter of a bevel gear differential. The teeth of the spur gear 81 are interlocked with those of a further spur gear 82 to form a spur gear stage 83. The spur gear 82 can in this case be connected rotationally fixed to a shaft 85 by a separating clutch 84, by which the connection to the transmission 11 in the agricultural machine drivetrain 1 is made. The ability to add in the drive axle 4 is realized by the separating clutch 84.

FIG. 4 shows a schematic view of a region of the agricultural machine drivetrain 1 in the region of an agricultural machine transmission 3' that is formed according to another embodiment of the invention. This agricultural machine transmission 3' in this case substantially corresponds to the agricultural machine transmission 3 from FIGS. 2 and 3, with the difference in this case being that the double clutch 56 on a main group 14' is positioned axially between input shafts 54' and 55'. Compared to the variant according to FIG. 2, the input shaft 54' is in this case adapted as a solid shaft with a reduced length, whereas the input shaft 55' is arranged as a hollow shaft axially overlapping and radially circumferentially in relation to a driveshaft 44' of the main group 14'. Lastly, the double clutch 56 as a result lies axially between the spur gear stages 62 and 63 of the main group 14'. Otherwise, the conceivable embodiment according to FIG. 4 corresponds to the variant according to FIGS. 2 and 3; reference is therefore made to the associated descriptions above.

FIG. 5 shows a schematic view of a region of the agricultural machine drivetrain 1, wherein an agricultural machine transmission 3" is provided in the agricultural machine drivetrain 1 according to a third embodiment of the invention. This embodiment likewise corresponds to the design according to FIGS. 2 and 3, where in contrast to that embodiment, a creep gear group is removed. Instead, the output shaft 23 of the split group 12 is now permanently coupled to the driveshaft 44 of the main group 14, in that a spur gear 86 is arranged rotationally fixed on the output shaft 23, the teeth of the spur gear 86 interlocking with those of a spur gear 87, thus together forming a spur gear stage 88. The spur gear 87 is in this case positioned rotationally fixed on the driveshaft 44 of the main group 14, therefore permanently coupling the split group 12 and the main group 14 by the spur gear stage 88.

In this case, the driveshaft 44 is now no longer arranged coaxially in relation to the output shaft 23, but is oriented along an axis that is offset in relation to the latter. Likewise, the pinion shaft 59 is no longer placed coaxially in relation to the countershaft 24 of the split group 12. As a further difference, a spur gear 89 is provided axially adjacent to the bevel gear 80 and rotationally fixed on the pinion shaft 59, wherein the spur gear 89 meshes with a spur gear 90 that is placed rotationally fixed on an interim shaft 91. Likewise, a further spur gear 92 is arranged rotationally fixed on the interim shaft 91 and whose teeth interlock with those of a spur gear 93, wherein this spur gear 93 can be connected rotationally fixed to the shaft 85 by the separating clutch 84. In this regard, the pinion shaft 59 is coupled to the shaft 85 when the separating clutch 84 is actuated by a spur gear stage 94 formed by the spur gears 89 and 90 and by a spur gear stage 95 formed by the spur gears 92 and 93.

Lastly, the hydraulic pump 16 is directly connected rotationally fixed to the input shaft 15, whereas the hydraulic pumps 17 and 18 are permanently coupled to the input shaft 5 by a bevel gear stage 96. Otherwise, the conceivable embodiment according to FIG. 5 correspondence to the variant according to FIGS. 2 and 3; reference is therefore made to the associated descriptions for the latter.

Furthermore, FIG. 6 also shows a schematic view of a region of the agricultural machine drivetrain 1 that is in this case equipped with an agricultural machine transmission 3''' according to a fourth conceivable embodiment of the invention. This conceivable embodiment in this case substantially corresponds to the above variant according to FIG. 5, with the difference being that a split group 12' and a main group 14'' both have a deviating design.

On the split group 12', a spur gear stage 26' is then formed by interlocking the teeth of the spur gears 31 and 33, whereas the spur gear 33 and the spur gear 32 are not meshed. Further, on spur gear stage 29', the teeth of a spur gear 38' and a spur gear 39' interlock, of which the spur gear 38' is placed rotationally fixed on the output shaft 23, and the spur gear 39' is placed rotationally fixed on the countershaft 24. Lastly, the spur gear 35 meshes with the spur gear 34 to form the spur gear stage 27, and also with a spur gear 41' wherein a spur gear stage 30' is formed in the case cited second. The spur gear 41' can in this case again be connected rotationally fixed to the spur gear 33 by actuating the powershift element K5. Gears of the split group 12' can in this case be shifted analogously to what is described in FIG. 3.

Compared to the variant according to FIG. 5, two further spur gear stages 97 and 98 in addition to the spur gear stages 60 to 63 are provided on the main group 14'' of the agricultural machine transmission 3'''. A further coupling of the input shaft 54 of the main group 14'' to the pinion shaft 59 can in this case be made by the spur gear stage 97, whereas the spur gear stage 98 acts as a further coupling of the input shaft 55 to the pinion shaft 59.

In the present case, the spur gear stage 97 in this case is made up of a fixed gear 99 and an idler gear 100 whose teeth permanently engage with those of the former, and of which the fixed gear 99 is arranged rotationally fixed on the input shaft 54, and the idler gear 100 is positioned rotatably on the pinion shaft 59. The latter can then in this case be locked on the pinion shaft 59 by a shift element 101, causing the input shaft 54 and the pinion shaft 59 to be coupled to each other by the spur gear stage 97. Like the shift elements 72 to 75, the shift element 101 is adapted as a shape-locking shift element in the form of a locking synchronization and can be transitioned into the shift setting by an associated actuator element 103.

On the spur gear stage 98, the teeth of a fixed gear 103 and an idler gear 104 are permanently interlocking, wherein the fixed gear 103 is in this case placed rotationally fixed on the input shaft 55, whereas the idler gear 104 is positioned rotatably on the pinion shaft 59. The spur gear stage 98 in this case is mapped to a shift element 105 that when actuated locks the idler gear 104 on the driveshaft 59 and is adapted as a shape-locking shift element. As a locking synchronization, the shift element 105 can in this case be moved into its shift setting by an associated actuator element 106, whereupon the input shaft 55 and the pinion shaft 59 are coupled to each other by the spur gear stage 98.

In this regard, six different gears can be shifted on the agricultural machine transmission 3''' by the main group 14'' under load in the manner of a double clutch transmission, in that here as well the transmission ratios of the spur gear stages 61 to 63 and 98 and 99 are arranged alternatingly between the two input shafts 54 and 55 and the pinion shaft 59. Otherwise, the conceivable embodiment according to FIG. 6 corresponds to the variant according to FIG. 5; reference is therefore made to the associated descriptions for the latter.

Based on the inventive embodiments of an agricultural machine transmission, a large number of gears can be designed to be powershiftable.

LIST OF REFERENCE NUMERALS

1 Agricultural machine drivetrain
2 Drive machine
3, 3', 3'', 3''' Agricultural machine transmission
4 Drive axle
5 Drive axle
6 Drive wheel
7 Drive wheel
8 Drive wheel
9 Drive wheel
10 Differential gearbox
11 Transmission
12, 12' Split group
13 Creep gear group
14, 14', 14'' Main group
15 Input shaft
16 Hydraulic pump
17 Hydraulic pump
18 Hydraulic pump
19 Spur gear stage
20 Spur gear stage
21 Separating clutch
22 Auxiliary drive
23 Output shaft
24 Countershaft
25 Spur gear stage
26, 26' Spur gear stage
27 Spur gear stage
28 Spur gear stage
29, 29' Spur gear stage
30 Spur gear stage
31 Spur gear
32 Spur gear
33 Spur gear
34 Spur gear
35 Spur gear
36 Spur gear
37 Spur gear
38, 38' Spur gear
39, 39' Spur gear
40 Spur gear
41, 41' Spur gear
42 Shift element
43 Shift element
44, 44' Driveshaft
45 Spur gear stage
46 Spur gear stage
47 Spur gear
48 Spur gear
49 Countershaft
50 Spur gear
51 Spur gear 52 Shift device
53 Actuator element
54, 54' Input shaft
55, 55' Input shaft
56 Double clutch
57 Powershift clutch
58 Powershift clutch
59 Pinion shaft
60 Spur gear stage
61 Spur gear stage
62 Spur gear stage
63 Spur gear stage
64 Fixed gear
65 Idler gear
66 Fixed gear
67 Idler gear
68 Fixed gear
69 Idler gear
70 Fixed gear
71 Idler gear
72 Shift element
73 Shift element
74 Shift element
75 Shift element
76 Shift device
77 Shift device
78 Actuator element
79 Actuator element
80 Bevel gear
81 Spur gear
82 Spur gear
83 Spur gear stage
84 Separating clutch
85 Shaft
86 Spur gear
87 Spur gear
88 Spur gear stage
89 Spur gear
90 Spur gear
91 Intermediate shaft
92 Spur gear
93 Spur gear
94 Spur gear stage
95 Spur gear stage
96 Bevel gear stage
97 Spur gear stage
98 Spur gear stage
99 Fixed gear
100 Idler gear
101 Shift element
102 Actuator element
103 Fixed gear
104 Idler gear
105 Shift element
106 Actuator element
K1 Powershift element
K2 Powershift element
K3 Powershift element
K4 Powershift element
K5 Powershift element
KR Powershift element
XL Forward gear
L Forward gear
M Forward gear
H Forward gear
S Forward gear
XS Forward gear
RL Reverse gear
RM Reverse gear
RS Reverse gear

The invention claimed is:

1. An agricultural machine transmission, comprising:
a first powershift clutch;
a second powershift clutch;
a powershiftable main group comprising:
   a driveshaft,
   a first input shaft,
   a second input shaft,
   a pinion shaft,
   at least four spur gear stages between the first and second input shafts and the pinion shaft, each of the at least four spur gear stages comprises an idler gear and a fixed gear, the fixed gears of two of the at least four spur gear stages are rotationally fixed to the first input shaft of the main group, and
   shift elements associated with each of the at least four spur gear stages;
a powershiftable split group, the split group comprising:
   at least six different forward gears,
   at least three different reverse gears,
   an input shaft,
   an output shaft,
   a countershaft, and
   powershift elements, which when selectively actuated, can configure gears of the at least six different forward gears and the at least three different reverse gears between the input shaft and the output shaft of the split group;
   wherein the split group includes exactly six spur gear stages and exactly six powershift elements;
wherein the main group is arranged upstream or downstream of the split group in a direction of force transfer, and the driveshaft of the main group is respectively connectable rotationally fixed by the first powershift clutch to the first input shaft of the main group and by the second powershift clutch to the second input shaft of the main group;
wherein each of the at least four spur gear stages is configured to be integrated into a force transfer path by actuating a respective one of the shift elements, and in doing so individually coupling the respectively associated first or second input shaft of the main group to the pinion shaft of the main group by configuring respectively one gear of the at least four spur gear stages of the main group; and
wherein:
   teeth of a first spur gear interlock with teeth of a second spur gear, the first spur gear together with the second spur gear forming a first spur gear stage of the split group, wherein the first spur gear is arranged rotatably on the input shaft of the split group, can be locked on the input shaft of the split group by a first powershift element, and can be connected rotationally fixed to a third spur gear by a second powershift element;
   the second spur gear is placed rotatably on the output shaft of the split group, is connected rotationally fixed to a fourth spur gear by a third powershift element, and can be locked on the output shaft of the split group by a fourth powershift element;
   the first spur gear meshes with a fifth spur gear, and together with the fifth spur gear forms a second spur gear stage, wherein the fifth spur gear is arranged rotatably on the countershaft and can be connected rotationally fixed to a sixth spur gear by a fifth powershift element and can be locked on the countershaft by a sixth powershift element;

a third spur gear is positioned rotatably on the input shaft of the split group, meshes with a seventh spur gear that forms a third spur gear stage together with the third spur gear, and is arranged rotationally fixed on the output shaft;

a fourth spur gear is positioned rotatably on the output shaft of the split group and has teeth that interlock with teeth of an eighth spur gear, which together with the fifth spur gear forms a fourth spur gear stage and is arranged rotationally fixed on the input shaft;

a sixth spur gear is positioned rotatably on the countershaft of the split group and meshes with the seventh spur gear, which together with the sixth spur gear forms a fifth spur gear stage; and teeth of a ninth spur gear interlock with teeth of a tenth spur gear and together form a sixth spur gear stage, wherein the ninth spur gear is arranged rotationally fixed on the output shaft of the split group, and the tenth spur gear is arranged rotationally fixed on the countershaft of the split group.

2. The agricultural machine transmission according to claim 1, wherein the at least six different forward gears consists of exactly six different forward gears of the split group and the at least three different reverse gears can be shifted on the split group.

3. The agricultural machine transmission according to claim 2, wherein:
a first forward gear of the split group results by closing the first powershift element and the second powershift element;
a second forward gear of the split group results by actuating the third powershift element and the second powershift element;
a third forward gear of the split group results by closing the first powershift element and the fourth powershift element;
a fourth forward gear of the split group results by closing the third powershift element and the fourth powershift element;
a fifth forward gear of the split group results by closing the first powershift element and the fifth powershift element;
a sixth forward gear of the split group results by actuating the third powershift element and the fifth powershift element;
a first reverse gear of the split group results by closing the sixth powershift element and the second powershift element;
a second reverse gear of the split group results by closing the sixth powershift element and the fourth powershift element; and
a third reverse gear of the split group results by closing the sixth powershift element and the fifth powershift element.

4. The agricultural machine transmission according to claim 1, wherein the at least four spur gear stages of the main group has exactly four spur gear stages or exactly six spur gear stages.

5. The agricultural machine transmission according to claim 1, wherein individual spur gear stages of the at least four spur gear stages of the main group each having of one idler gear and one fixed gear with teeth of the one idler gear interlocking with teeth of the one fixed gear, and wherein the one fixed gear is positioned rotationally fixed on the respective input shaft, and the one idler gear is positioned rotatably on the pinion shaft of the main group and can be locked on the pinion shaft by a respectively associated shift element.

6. The agricultural machine transmission according to claim 1, wherein the first powershift clutch and the second powershift clutch are combined into a double clutch.

7. The agricultural machine transmission according to claim 6, wherein the double clutch is positioned axially between the driveshaft and the input shafts of the main group, and wherein the second input shaft is a hollow shaft axially overlapping and positioned radially and circumferentially with the first input shaft.

8. The agricultural machine transmission according to claim 1, wherein the output shaft of the split group is permanently coupled to the driveshaft of the main group.

9. An agricultural machine drivetrain, comprising the agricultural machine transmission according to claim 1.

10. An agricultural machine, comprising the agricultural machine drivetrain according to claim 9.

11. An agricultural machine transmission, comprising:
a first powershift clutch;
a second powershift clutch;
a powershiftable main group comprising:
 a driveshaft,
 a first input shaft,
 a second input shaft,
 a pinion shaft,
 at least four spur gear stages between the first and second input shafts and the pinion shaft, each of the at least four spur gear stages comprises an idler gear and a fixed gear, the fixed gears of only two of the at least four spur gear stages are rotationally fixed on the first input shaft of the main group, and
 shift elements associated with each of the at least four spur gear stages;
a powershiftable split group, the split group comprising:
 at least six different forward gears,
 at least three different reverse gears,
 an input shaft,
 an output shaft, and
 powershift elements, which when selectively actuated, can configure gears of the at least six different forward gears and the at least three different reverse gears between the input shaft and the output shaft of the split group;
wherein the main group is arranged upstream or downstream of the split group in a direction of force transfer, and the driveshaft of the main group is respectively connectable rotationally fixed by the first powershift clutch to the first input shaft of the main group and by the second powershift clutch to the second input shaft of the main group; and
wherein each of the at least four spur gear stages is configured to be integrated into a force transfer path by actuating a respective one of the shift elements, and in doing so individually coupling the respectively associated first or second input shaft of the main group to the pinion shaft of the main group by configuring respectively one gear of the at least four spur gear stages of the main group,
the first powershift clutch and the second powershift clutch are combined into a double clutch, and
the double clutch is positioned axially between the first input shafts and the second input shaft, wherein one of the first input shaft or the second input shaft of the main group is a hollow shaft axially overlapping and positioned radially and circumferentially with the driveshaft.

12. The agricultural machine transmission according to claim 11, comprising a creep gear group in the direction of power flow between the split group and the main group, wherein the output shaft of the split group can be connected rotationally fixed to the drive shaft of the main group by actuating a first shift element, wherein the creep gear group also has a countershaft, a first spur gear stage, and a second spur gear stage, of which the second spur gear stage permanently couples the countershaft to the output shaft or the driveshaft, and the first spur gear stage couples the countershaft to the driveshaft or the output shaft when a second shift element is actuated.

* * * * *